United States Patent [19]

Nishihara et al.

[11] 3,939,682

[45] Feb. 24, 1976

[54] METHOD AND MACHINE FOR USE IN HYDROSTATIC EXTRUSION

[75] Inventors: Masao Nishihara, Kyoto; Yoshihiro Yamaguchi, Ashiya; Tomiharu Matsushita, Nishinomiya; Tatsuo Yamasaki, Kobe; Masataka Nogushi, Nishinomiya; Kunihiko, Nishioka, Kobe, all of Japan

[73] Assignee: Kobe Steel Ltd., Kobe, Japan

[22] Filed: Sept. 19, 1973

[21] Appl. No.: 398,861

[30] Foreign Application Priority Data

Sept. 19, 1972   Japan................................ 47-93997

[52] U.S. Cl...................................... 72/60; 72/270
[51] Int. Cl.²............................................ B21C 33/00
[58] Field of Search............. 72/42, 41, 56, 60, 270

[56] References Cited
UNITED STATES PATENTS

| | | | |
|---|---|---|---|
| 3,072,251 | 1/1963 | Sauve..................................... | 72/60 |
| 3,345,842 | 10/1967 | Richards................................ | 72/42 |
| 3,698,220 | 10/1972 | Nilsson.................................. | 72/60 |
| 3,702,556 | 11/1972 | Larker et al........................... | 72/60 |

FOREIGN PATENTS OR APPLICATIONS

| 26,749 | 11/1968 | Japan..................................... | 72/60 |
|---|---|---|---|
| 1,043,834 | 9/1966 | United Kingdom..................... | 72/42 |

*Primary Examiner*—Lowell A. Larson
*Attorney, Agent, or Firm*—Oblon, Fisher, Spivak, McClelland & Maier

[57] ABSTRACT

A method and machine for use in hydrostatic extrusion wherein a portion of an elastic-plastic viscous pressure medium is introduced into the rear portion of a container, with the rear end thereof being sealed in a fluid tight fashion. The pressure medium being of such a nature that it has a high viscosity and cannot flow by itself. Subsequently, a billet is charged into the container and then a die is mounted in the container at the forward end thereof. The aforesaid pressure medium is caused to fill around the outer circumferential surface of the billet. In this respect, a high pressure seal is provided for the junctions between the die and the forward end of the container and between the die and the forward end of the billet before the pressure medium flows out of the container in a practically negligible small amount, immediately after which a pressure stem is pushed into the container from the rear end thereof, thus proceeding with the hydrostatic extrusion.

5 Claims, 17 Drawing Figures

METHOD AND MACHINE FOR USE IN HYDROSTATIC EXTRUSION

BACKGROUND OF THE DISCLOSURE

1. Field of the Invention:

The present invention relates to a method and machine for use in hydrostatic extrusion and more particularly to a method and machine for use in hydrostatic extrusion wherein a billet is placed in a container in sealing relation and the pressure medium is compressed in the container such that the billet is extruded under a triaxial compressive force.

2. Description of the Prior Art:

Although hydrostatic extrusion has many advantages, such as low extruding load, good lubrication and feasibility of extruding a long billet, it has suffered from the disadvantages inherent thereto, in that the cycle time of the extrusion is longer than that of the desired cycles of extrusion which can meet the demand from the production field, since excessive time and man power are required for charging and discharging the pressure medium into and from the container.

Furthermore, with warm or hot hydrostatic extrusion, a billet preheated outside the machine is charged into the container and then the pressure medium is introduced into the container, resulting in the drawback that it takes a considerable length of time before starting the extrusion with an accompanied undesirable tendency of an appreciable degree of decrease in the temperature of the billet due to heat-radiation. A further problem experienced is that, since the pressure medium is introduced into the container after charging the billet into the container, the pressure medium has to be subjected to disturbance, thereby accelerating the heat exchange between the billet and the pressure medium, with the result that thermal efficiency is lowered and undesirable thermal loss is encountered.

Included by the pressure medium for use in such a conventional hydrostatic extrusion is, in general, a liquid-state pressure medium such as castor oil. On the other hand, there has been proposed a special method wherein glass is used as a lubricant for hot extrusion in an attempt to enhance the efficacy of the hydrostatic extrusion by using a layer of glass having an increased thickness.

More particularly, this method involves the steps of placing a glass pad molded to a solid state in the front or rear of a billet charged in a container, whereby the glass in contact with the preheated billet may be melted to fill the gap between the billet and the container, and then extrusion follows. In this respect, the glass used serves the dual purposes of a lubricant and a pressure medium. However, this method presents only a partial solution to the aforesaid disadvantages. In other words, although the use of a solid stage pressure medium may result in decreasing the time required for charging said medium into the container, as compared with the case of using a conventional liquid state pressure medium, it is impossible to start the extrusion under hydrostatic pressure, immediately after charging the billet into the container, since such a step should be followed wherein the pressure medium in a solid state receives the heat from the billet and thus is melted to fill the gap around the circumference of the billet. This apparently fails to shorten the total time required for extrusion with the accompanied decreased thermal efficiency due to a heat loss for melting the glass. In addition to this, this method can be applied only to the temperature range above the melting point of the glass, and thus the temperature range used is to some extent subjected to limitation.

SUMMARY OF THE INVENTION

It is therefore an object of the invention to provide a method and machine for use in hydrostatic pressure extrusion, which can shorten the time for charging a pressure medium into a container, such that the extrusion may be commenced immediately after the charge in an attempt to shorten the time required for cycle of extrusion and production efficiency is improved.

It is a further object of the invention to provide a method and machine for use in hydrostatic pressure extrusion which can minimize the the amount of heat radiation from a billet, during the time from the introduction of the heated billet into the container until the commencement of the extrusion, thereby improving thermal efficiency.

According to the present invention, these objects and features may be attained by adopting as a pressure medium a material having special properties and by presenting extruding operations suited for such a special pressure medium and a machine useful for the same.

More particularly, according to the method and machine for use in hydrostatic extrusion according to the present invention, a portion of an elastic plastic viscous pressure medium is introduced into the rear portion of a container, with the rear end thereof being sealed in a fluid tight fashion, the pressure medium being of such a nature that it has a high viscosity and cannot flow by itself. Subsequently, a billet is charged into the container and then a die is mounted in the container at the forward end thereof. The aforesaid pressure medium is caused to fill around the outer circumferential surface of the billet. In this respect, a high pressure seal is provided for the junctions between the die and the forward end of the container and between the die and the forward end of the billet before the pressure medium flows out of the container in a practically negligible small amount, immediately after which a pressure stem is pushed into the container from the rear end thereof, thus proceeding with the hydrostatic extrusion.

According to another aspect of the present invention, prior to the introduction of the billet into the container, the billet is heated up to 500°C, whereby the pressure medium is heated up to a temperature below the drop point of the pressure medium.

If required, the inner wall of the container is heated and maintained at a temperature below the drop point of the pressure medium, before charging of the pressure medium into the container.

According to still a further aspect of the invention, a pressure medium, billet and die are placed in sequential order into the container, as viewed from the container side, along the center line of the machine.

In addition to such methods, the present invention presents a machine useful for such methods. More specifically, the hydrostatic extrusion machine of the invention comprises a container adapted to move along the center line of an extrusion press, a die block movable toward the center line of the extrusion press, with a die placed at the front end of the container, and a device for supplying pressure medium adapted to move toward the center line of extrusion and having a cylinder for holding the pressure medium formed with an opening on the container side in addition to a charging rod adapted to slidingly move through the cylinder.

BRIEF DESCRIPTION OF THE DRAWINGS

A more complete appreciation of the invention will be easily obtained as the same becomes better understood by reference to the following detailed description when considered in connection with the accompanying drawings, wherein.

DETAILED DESCRIPTON OF THE PREFERRED EMBODIMENTS

As has been described, the present invention uses a novel type of pressure medium in the sense that it has not been previously used in the field of the hydrostatic pressure extrusion. The pressure medium as used in the present invention is an elastic-plastic viscous material that has a substantial degree of viscosity such that the material exhibits virtually no flow by itself upon its insertion into the container but presents sufficient fluidity and transmits the pressure hydrostatically when an external force besides gravity is exerted thereto. Typical of such a material are the following three groups of materials:

a. Grease Group Comprising:
1. soap type greases composed of a petroleum oil and soaps such as fatty acids, soaps of sodium and calcium and lithium;
2. complex greases in which the soap phase is prepared by the solidification of compounds composed of soap and a complexing agent such as water, salt, etc.;
3. non-soap type greases in which metal phtalocyanines, silicas, metal oxides, etc. are used as a gelling agent.

b. Wax or fat group comprising beeswax, carnauba wax, montan wax, spemaceti wax, woll wax, lanolin, lard.

c. Mixture or suspension in which a solid lubricant such as molybdenum disulfide, graphite, lead oxide, polytetrafluorethylene, etc. is added to the aforesaid material belonging to a) or b) group. It is needless to mention that, since the materials included in the aforesaid groups permit the transmission of pressure at a substantially constant level in a hydrostatic manner throughout the extruding operations and furthermore are stable in the temperature range above or equal to the billet temperature, such materials have properties essential as a pressure medium for use in hydrostatic extrusion according to the present invention.

The material, as has been referred to above, is introduced into the container in the form of a lump or block according to the present invention.

It often occurs that the temperature of the container is substantially close to room temperature, when starting the operation of a press. In practicing the method of the present invention using warm or hot extrusion, the temperature at the inner wall of the container may be preheated to a temperature below the drop point of the pressure medium, thereby preventing the temperature drop of the billet, thus achieving increased efficiency even at the beginning of the operation.

On the other hand, a disadvantage is encountered with a continuous extruding operation, in that the temperature at the inner wall of the container is gradually increased to a temperature, as the case may be, above the dropping point of the pressure medium, thus presenting difficulties for the introduction of the pressure medium into the container, coupled with an undesirable thermal effect on the container and other machine parts. However, to avoid such a disadvantage, the container may be cooled so as to bring the temperature at the iner wall thereof to a temperature below the dropping point of the pressure medium.

Description will now be given in detail with reference to the accompanied drawings.

FIGS. 1(A) to (E) show the progress of the steps used in the method of the present invention.

Figure 1A:
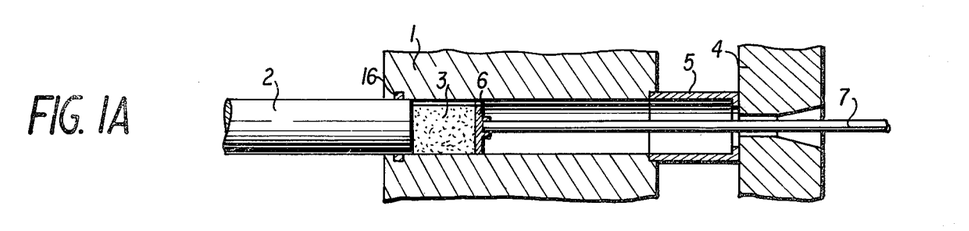
FIGS. 1(A) to (E) are longitudinal cross-sectional views showing steps of extrusion of a solid rod in the order of progress of the steps.

Referring to FIG. 1(A) which shows a pressure medium 3 being supplied, there is provided a cylinder 5 holding the pressure medium 3 between a container 1 and a back platen 4. A shifting rod 7 which is provided with a pusher 6 is movable axially and extends through a through-hole provided in the back platen 4.

Figure 1B:
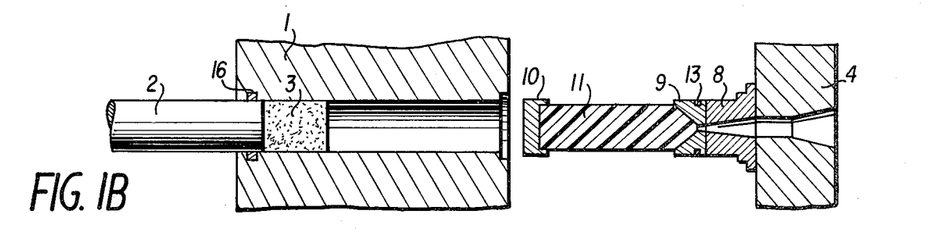

FIG. 1(B) shows inserting a billet, in which the billet 11 is positioned with one end of the billet fitted in a conical portion of a die 9 held by a die holding fixture 8 and with the other end of the billet attached to a billet guide 10.

Figure 1C:
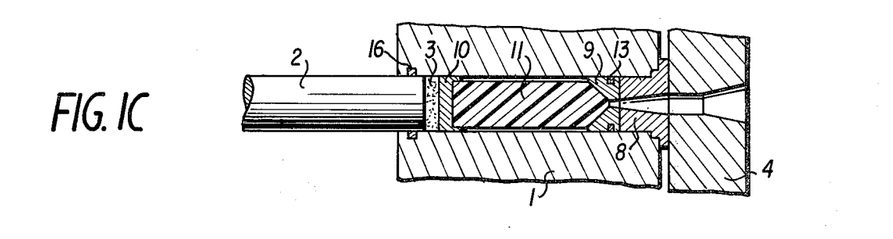
Figure 1D:
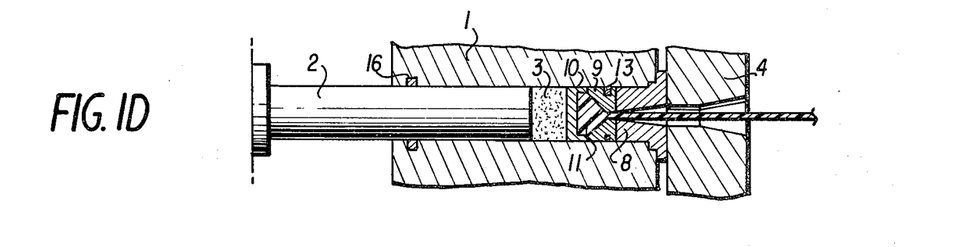
Figure 1E:
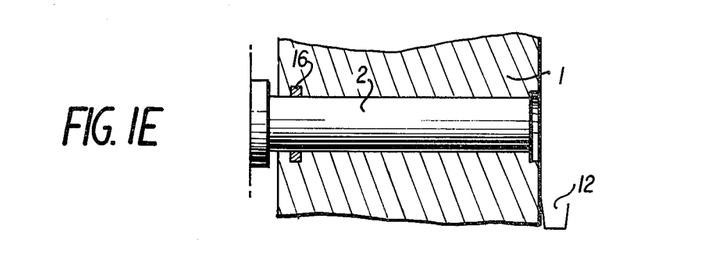

FIG. 1(C) shows the condition immediately before extrusion, FIG. 1(D) shows the condition during extrusion, and FIG. 1(E) shows the condition after extrusion. Shown at 12 is a box for receiving the pressure medium.

The sequence of the steps in the method of the present invention will be described hereinafter with reference to FIGS. 1(A) to (E).

Firstly, the cylinder 5 containing therein the pressure medium 3 is placed between the container 1 and the back platen 4, and then a shifting rod 7 is moved toward the container 1 by means of a hydraulic cylinder (not shown), whereby the pressure medium 3 is forced into the container by means of the pusher 6 (FIG. 1(A)).

Subsequently, after moving the shifting rod 7 toward the back platen 4 the cylinder 5, the pusher 6 and the shifting rod 7 are retracted, and then the container 1 is moved to the left as seen in the drawing, with the stem 2 being fitted therein. Thereafter, a billet 11 is placed in the space between the container 1 and the back platen 4, one end of the billet 11 being fitted in a conical portion of the die 9 held by the die holding fixture 8 and the other end thereof, i.e., the rear end thereof, being fitted in the billet guide 10 having axial grooves in its outer circumference, (FIG. 1(B)).

In the case where warm or hot extrusion is carried out as described above, the billet 11, billet guide 10 and die 9 are preheated externally to a desired temperature. It is preferable that the pressure medium be preheated before its introduction into the container, to thereby minimize the heat loss from the billet and to improve thermal efficiency. It is also desirable that the temperature of the pressure medium thus heated be below the drop point of the pressure medium for the purpose of preventing the pressure medium from dropping and flowing out of the container.

At the time of starting the press operation, it is often that the temperature of the container itself is equal to room temperature. In such a case, a heating means such as heating coils may be inserted in the container beforehand, prior to charge of the pressure medium, such that the temperature at the inner wall of the container is maintained at a preferable temperature below the drop point of the pressure medium, after which the heating means is removed from the container and the pressure medium is inserted.

It is possible that, during the continuous extruding operation, the temperature at the inner wall of the container may be gradually increased to a temperature above the drop point of the pressure medium. In such a case, the container is cooled by using a cooling means so as to lower the temperature at the inner wall of the container to a temperature below the drop point of the pressure medium used. In the case of a fluid-supported type container, such cooling may be accomplished by using a cooling medium which is also used for supporting the inner cylinder, or otherwise by using a cooling medium provided outside the container.

Thereafter, the container 1 and the stem 2 are advanced, while maintaining a constant relative position therebetween so as to press the front end of the container 1 against the stepped or flanged portion of the die holding fixture 8. (FIG. 1(C)).

At this time, the billet 11 is inserted into the container 1, with the pressure medium 3 surrounding the billet. In this respect, the pressure medium 3 essentially excludes air therefrom, such that the billet 11 and the pressure medium 3 are completely packed in the container 1, when the container is advanced to the point where the high pressure packing 13 on the die side 9 functions.

When the stem 2 is further acvanced, the billet 11 will be extruded through the opening of the die 9. (FIG. 1(D)).

Upon completion of the extrusion stage, the pressure within the container is lowered and the container 1 is moved backward and then the portion of the billet to be discarded is removed. The remaining pressure medium 3 is introduced into a box 12 provided ahead of the container 1, by advancing the stem 2. (FIG. 1(E)).

In this manner, one cycle of the extrusion process is completed.

Figure 2A:
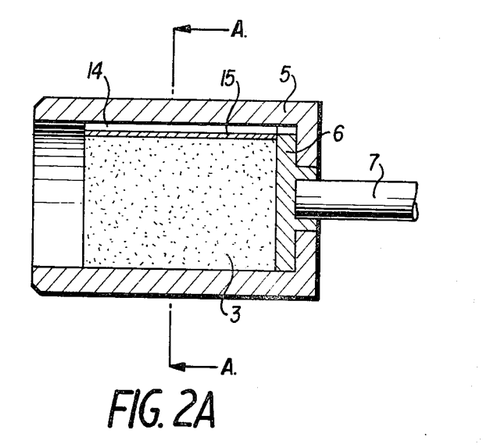
FIG. 2(A) is a longitudinal cross-sectional view of a pressure medium supply device of the invention.
Figure 2B:
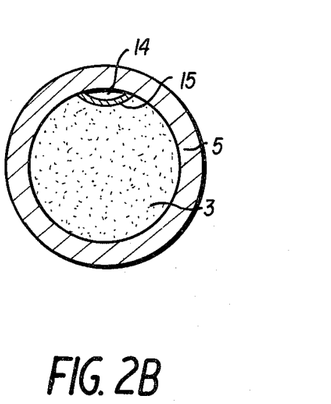
FIG. 2(B) is a cross-sectional view taken along the line A—A of FIG. 2(A)

FIGS. 2(A) and (B) show in detail the device for supplying the pressure medium.

Longitudinally and forwardly extending from the upper end of the pusher 6 is an elongated portion 15 which defines an air discharge passage 14.

When shifting rod 7 is moved toward the container 1, and thus the pressure medium 3 contained in the cylinder 5 is inserted into the container 1, there remains air entrapped within the container 1. In this respect, the remaining air cannot be discharged from the stem side, because of a seal 16 fitted on the stem. For this reason, there is provided, as described hereinbefore, an elongated portion 15 extending integrally from the pusher 6 to thereby define the air discharging passage 14, whereby the pressure medium 3 may be inserted into the container 1 until the medium 3 contacts the stem 2, while discharging the air through the air discharging passage 14 from the container 1.

Figure 3A:
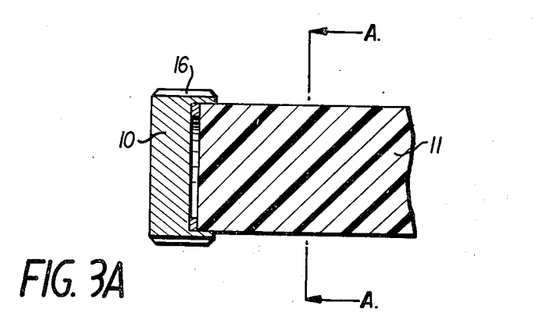
FIG. 3(A) is a longitudinal cross-sectional view of a billet guide of the invention.
Figure 3B:
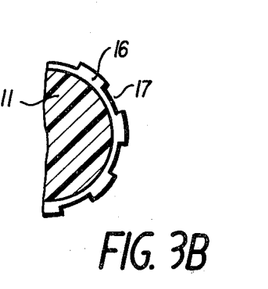
FIG. 3(B) is a cross-sectional view taken along the line A—A of FIG. 3(A)

FIGS. 3(A) and (B) show the detailed construction of the billet guide. There are formed a plurality of recessed or grooved portions 17 in the outer circumference of the billet guide 10, such that the pressure medium placed rearwardly of the billet guide 10 may make ingress therethrough to the billet side.

Figure 4A:
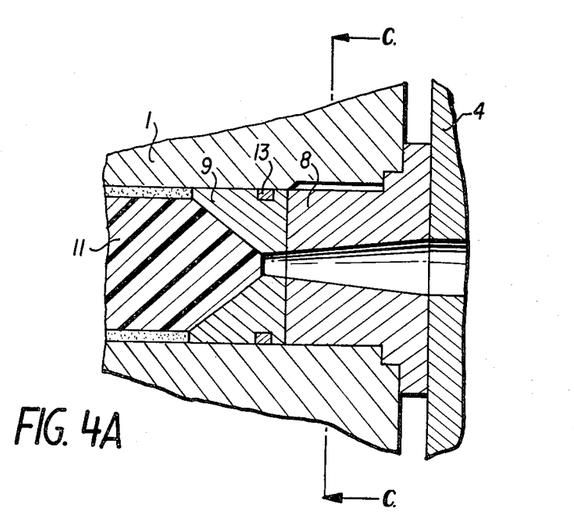
FIG. 4(A) is a longitudinal cross-sectional view showing the fitting relationship of a container and die holder.
Figure 4B:
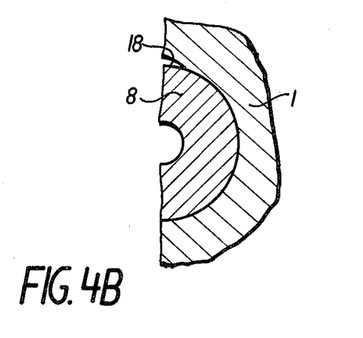
FIG. 4(B) is a cross-sectional view taken along the line C—C of FIG. 4(A)

FIGS. 4(A) and (B) show in detail the fitting relationship of the container on the die holding fixture 8, the container 1 being formed with a recessed portion 18 so as to discharge air entrapped in the container to the outside, before the high pressure packing 13 functions at the time of insertion of the die 9.

Figure 5:
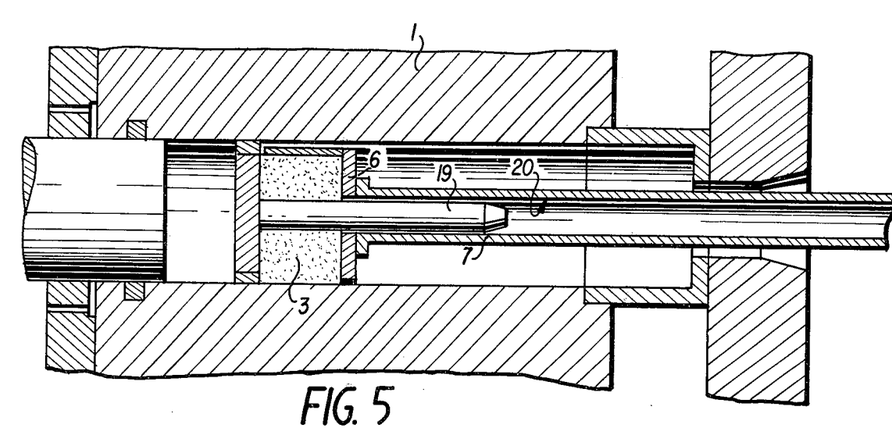
FIG. 5 is a longitudinal cross-sectional view of one embodiment of the invention wherein a tubular body is extruded.

While the description has been given for the case where a solid rod is extruded, the method and machine according to the present invention may likewise be applied to the extrusion of a tubular body, except that the latter case uses a hollow billet and a mandrel located at a different position from that in the former case, presenting minor modifications as shown in FIG. 5. More particularly, FIG. 5 corresponds to FIG. 1(A) showing the extrusion of a solid rod, providing a pusher and a shifting rod having hollow portions 20 of a diameter corresponding to that of a mandrel 19. Thus, the portion of pressure medium may be placed at the root portion of the mandrel 19 in a manner the same as in the former embodiment (FIG. 1).

Figure 6A:
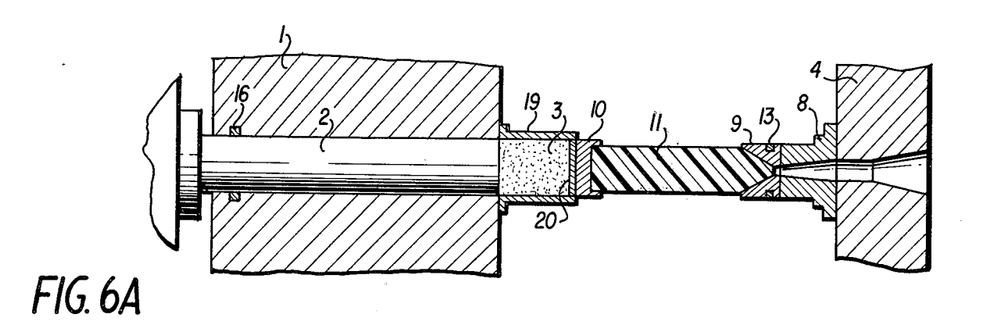
FIGS. 6(A) and (B) are longitudinal cross-sectional views showing one embodiment of the method, whereby a pressure medium, billet and die are charged in or mounted on the container.
Figure 6B:
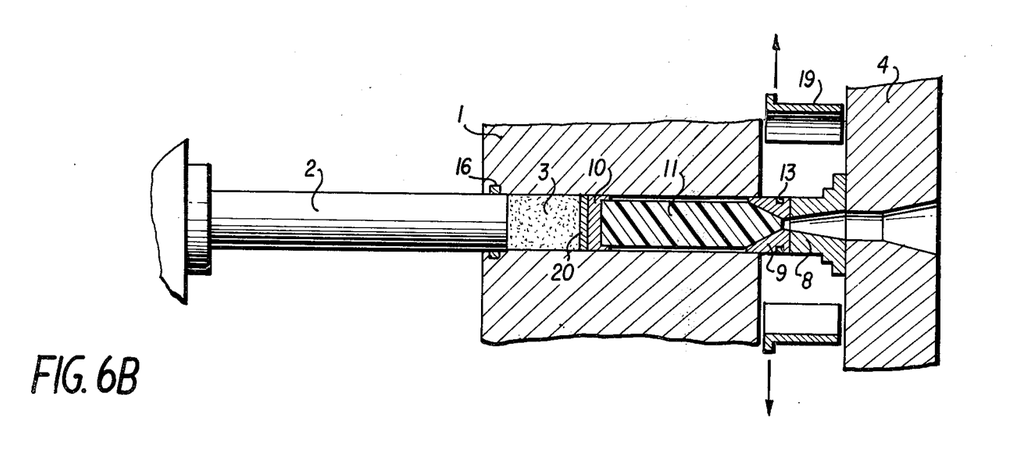

FIGS. 6(A) and (B) shows another embodiment of the invention, wherein to practice the present invention in a more efficient manner in production, the pressure medium, billet, and die are efficiently inserted into the container in an attempt to shorten the time prior to commencement of extrusion. In short, the pressure medium, billet and die or members to be inserted or equipped within or in the front end of the container are placed beforehand in series along the center line of the extrusion, and thus all of these members may be inserted or equipped therein at one time. More particularly, in FIG. 6, shown at 19, is a cylinder containing pressure medium 3 and at 20 a heat-insulating pad having a convexed portion which is adapted to be in register with the recessed portion 17 provided in the outer circumference of the billet guide 10 as shown in FIG. 3(B), said pad being made of a cloth of silica glass fibers heat-insulating rubber, or the like.

Referring to the embodiment of the invention as shown in FIGS. 6(A) and (B), a container 1 is moved away and the pressure medium is charged beforehand into the forward portion of the container 1. Also provided in the forward portion thereof is a cylinder 19 consisting of two halved parts and having a heat-insulating pad fitted in the forward end thereof. Subsequently, a billet 11 is placed between the pressure medium holding cylinder 19 and the back platen 4, the billet 11 having one end fitted in the conical portion of the die 9 held by a die holding fixture 8 and having the other or rear end received by a billet guide 10. In this respect, the billet 11, billet guide 10 and die 9 are heated beforehand outside the machine to a desired temperature.

The container is then advanced, and there are inserted in turn the pressure medium 3, heat-insulating pad 20, billet guide 10, billet 11 and die 9, after which the die holding fixture 8 is inserted in the container 1. During this phase, the cylinder 19 is advanced toward the die by means of the container 1 and is then removed therefrom, after the pressure medium 3 has been inserted into the container 1.

The extrusion is carried out by advancing the stem 2, immediately after the pressure medium 3 and the billet 11 have been inserted in the container 1. The viscous pressure medium surrounds the billet wholly. It should be noted that the pressure medium 3 is forced to flow to the billet side through a plurality of recessed or grooved portions provided in the outer circumferences of the heat-insulating pad 20 and billet guide 10.

This permits the application of hydrostatic pressure to the billet 11.

The following description is given to describe a novel machine useful for practicing the method of the invention in an efficient manner. In this machine, as has been described with reference to the previous embodiments, the pressure medium, which can hardly flow under atmospheric pressure, is charged in a cylinder for holding the pressure medium. The pressure medium holding cylinder containing a predetermined quantity of pressure medium is then placed ahead of the stem which allows an axial movement and uses a high pressure packings for sealing, before the billet is charged into the container, i.e., before the container is advanced to house the billet therein. The pressure medium is then compressed and caused to flow by being squeezed by the rear end of the billet and the forward end of the stem, both of which are moved closer to each other, such that the pressure medium is caused to flow. In the subsequent step, the pressure medium flows, through the longitudinal grooves provided in the circumferential surfaces of the billet guide and heat-insulating pad, into the gap defined by the inner wall of the container and the outer circumferential surface of the billet. In other words, the pressure medium fills the aforesaid gap, sealed with a packing mounted on a die block, thereby effecting extrusion of a billet in a reasonable manner.

Figure 7:
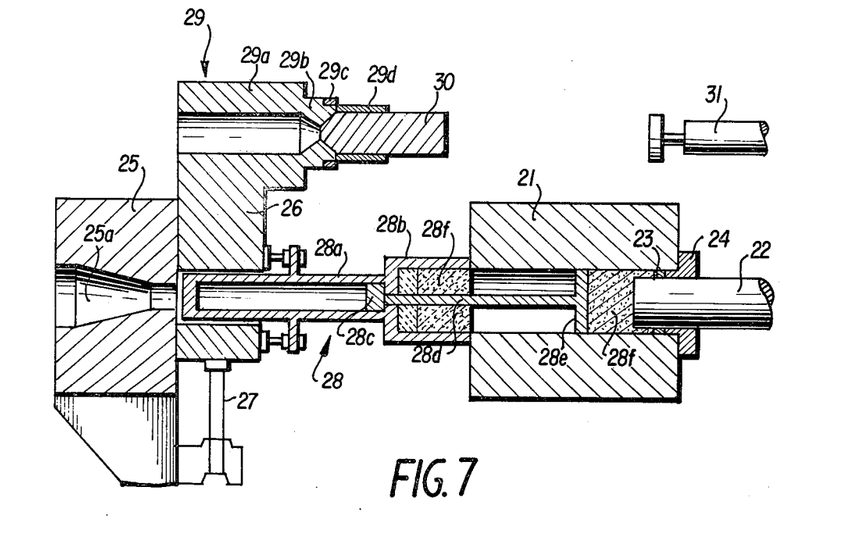
FIGS. 7, 8 and 9 are longitudinal cross-sectional views showing sequential steps of operation of one embodiment of a machine according to the present invention.

Referring now to FIG. 7, showing another embodiment of the invention, shown at 21 is a pressure container for use in a hydrostatic extrusion press. A pressure stem 22 is provided so as to be introduced into the container 21 from the rear side thereof, while being slidingly guided with a packing holder 24 which backs up a super-high pressure packing 23 from the rear side. Thus, the rear end of the pressure container 21 is sealed with the packing 23 and pressure stem 22. Although not shown herein, the pressure container 21 may move integrally with the packing holder 24. Located in the front of the pressure container 21 is a press platen 25 whose opening 25a is aligned coaxially with the C. L. of the pressure container 21.

A sliding member 26 slides along the surface on the container side of the platen 25 by means of a hydraulic cylinder 27.

The sliding member 26 is provided with a pressure supply device 28 and a billet charging die block 29, both of which are positioned in parallel relation to each other as well as to the C. L. of the machine. The device 28 for supplying the pressure medium consists of: a hydraulic cylinder 28a which is secured with bolts and nuts to the sliding member 26 in parallel to the C. L.; a holding cylinder 28b which has an inner diameter the same as that of the container 21 coupled through the cylinder 28b with the hydraulic cylinder 28a; a movable piston 28c fitted in the hydraulic cylinder 28a; and a charging plate 28e which is supported with a piston rod 28d within the container 21 and is fittable in the pressure medium holding cylinder 28b. When the device for supplying the pressure medium is in the position as shown in FIG. 7, the pressure medium 28f charged within the cylinder 28b for holding the pressure medium may be charged into the container 21 due to operation of the hydraulic cylinder 28a.

The die block 28 for charging the billet consists of: a die block 29a holding a die 29b; a high pressure packing 29c fitted on the shoulder portion of the die portion 29b; and a cylinder 29d for holding the billet. As shown in FIG. 7, a billet 30 is attached in a concaved conical die 29b by means of a billet charging cylinder 31, part of which is shown in parallel to the container 21.

The operation of the machine according to the hydrostatic extrusion of the present invention will now be described, in detail, by referring to FIGS. 7, 8 and 9.

Firstly, as shown in FIG. 7, the hydraulic cylinder 27 for use in sliding movement is operated so as to shift the pressure medium supply device 28 in alignment with the center line of the pressure container 21, with the container side surface of the pressure medium holding cylinder 28b in contact with the front surface of the pressure container 21. Then, the hydraulic cylinder 28a is operated so that a predetermined amount of the pressure medium 28f, which has been charged into the pressure medium holding cylinder 28b beforehand, (see the dotted line portion of FIG. 7) is charged into the container by pushing the charging plate 28e toward the pressure stem 22. After a desired amount of the pressure medium has been charged into the container, only the charging plate 28e will be restored to its initial position.

During the operation of charging the pressure medium, the billet 30 is mounted in the die block 29, i.e., the billet 30 is mounted on the die 29b by operation of the billet charging cylinder 31.

Figure 8:
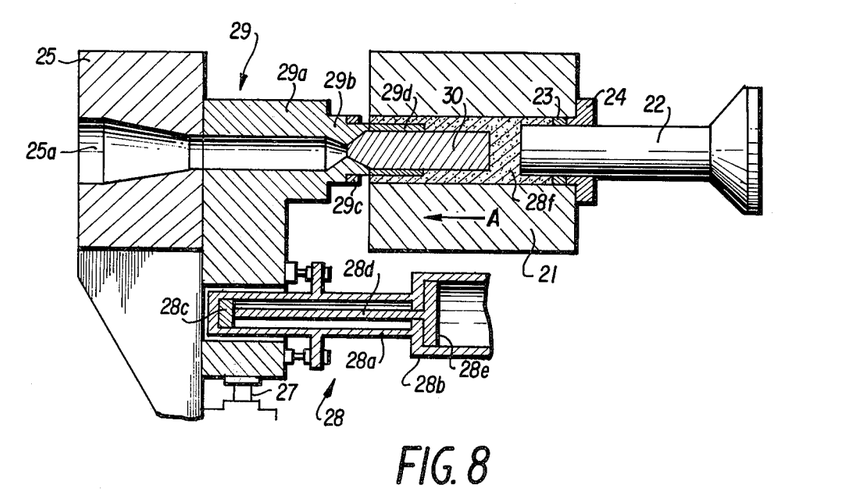

As shown in FIG. 8, upon completion of the aforesaid pressure medium charging, the sliding member 26 is moved by means of the hydraulic cylinder 27 for use in sliding movement to such a position where the die block 29 holding billet 30 is brought into alignment with the center line of the pressure container 21. In this stage, as the pressure container 21 and stem 22 are advanced, the billet 30 which has been held with the billet holding cylinder 29d of the die block 29 is charged into the pressure container 21 (in a direction shown by an arrow A in FIG. 8). Along therewith, the pressure medium 28f which has been charged beforehand, is compressed between the rear surface of the billet and the forward end of the stem. Thus, because of the pressure container 21 being sealed at its rear end by means of packing device 23, 24, the pressure medium 28f thus compressed is filled in the gap defined by the billet 30 and the inner wall of the pressure container 21 from the pressure-stem side to the die block side, until the container 21 is practically filled with the pressure medium 28f, before the super-high-pressure packing 29c mounted on the die block 29 is fitted in the forward inner diameter portion of the pressure container 21.

Figure 9:
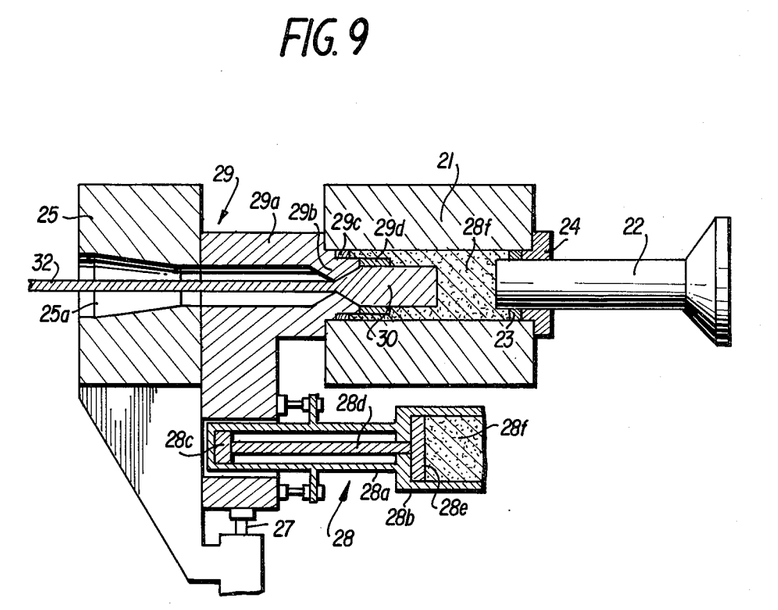

As shown in FIG. 9, when the pressure medium 28f has been charged into the pressure container 21 to a desired amount, the pressure container 21 and the stem 22 are further advanced so as to locate the die block between the forward end of the pressure container 21 and the press platen 25, with the high pressure packing 29c being fitted in the inner diameter of the container to thereby seal the forward end of the container 21.

A further advance of the pressure stem 22 increases the pressure of the pressure medium 28f sealed, and the billet 30 is then extruded as a product 32 through the die 29c.

In line with the aforesaid extrusion, the pressure medium 28f is again charged in the cylinder 29b for holding the pressure medium in the supply device 28 located aside the pressure container 21, thus preparing for the subsequent charging of the pressure medium.

As is apparent from the foregoing description, the method and machine according to the present invention use viscous material as the novel pressure medium which flow very little under the influence of gravity, and thus there are provided the extruding operations well matching with the properties of the pressure medium, thereby enabling satisfactory and efficient hydrostatic extrusion. The advantages of the present invention being in contrast to the case where ordinary castor oil is used, the pressure medium in the form of a lump or block may be charged in the container beforehand, before the billet is charged therein, with the result that the time from the billet charging until the commencement of the extrusion may be shortened to a great extent. The machine as shown in FIGS. 7, 8 and 9 are well suited for mounting the billet on the die, in line with the supply of the pressure medium, whereby the time required for the preliminary operations before the commencement of the extrusion cycles per unit hour, thus improving production efficiency.

Particularly, in the case of hot or warm extrusion, the heat loss from the heated billet may be minimized, by compressing the aforesaid time required and by heating the pressure medium to a required temperature, by maintaining the inner wall of the container at a required temperature by heating or cooling the same, and thus the thermal efficiency of the extrusion may be materially improved.

It will be understood that the above description is merely illustrative of preferred embodiments of the invention. Additional modifications and improvements utilizing the discoveries of the present invention can be readily anticipated by those skilled in the art from the present discoveries, and such modifications and improvements may fairly be presumed to be within the scope and purview of the invention as defined by the claims that follow.

We claim:

1. A method of use in hydrostatic extrusion comprising the steps of:
   sealing a stem in the rear portion of a container in a fluidtight manner;
   inserting, from the forward end of said container, a lump of viscous pressure medium being capable of hydrostatically transmitting pressure, into the rear portion of said container;
   subsequently charging, from the forward end of said container, a pre-heated billet together with a die mounted at the front end of said billet into said container, thereby causing said pressure medium to fill around said pre-heated billet, discharging substantially all air from said container, before any excess flow of said pressure medium flows out of said container;
   immediately thereafter, elevating the pressure required for hydrostatic extrusion by pushing said stem forwardly from said rear portion of said container such that homogeneous pressure is hydrostatically applied to said billet by means of said viscous pressure medium.

2. A method as defined in claim 1, wherein said pressure medium used is selected from the following groups:
   a) a grease group comprising:
      1. soap type greases being composed of a petroleum oil and soaps such as fatty acids, soaps of sodium and calcium and lithium,
      2. complex greases in which the soap phases are prepared by the solidification of compounds composed of soap and complexing agent such as water, salt, or the like,
      3. non-soap type greases in which metal phtalocyanines, silicas, metal oxides, and the like are used as a gelling agent.
   b. wax or fat group comprising beeswax, carnauba wax, montan wax, spemaceti wax, woll wax, lanolin, lard.
   c. mixture or suspension in which a solid lubricant such as molybdenum disulfide, graphite, lead oxide, polytetrafluorethylene or the like is added to the aforesaid material belonging to said a) or b) group.

3. A method as defined in claim 1, wherein, prior to the charge of said billet into said container, said billet is preheated up to 500°C, while said pressure medium is preheated up to a temperature below the drop point of said pressure medium.

4. A method as defined in claim 1, wherein the temperature at the inner wall of said container is maintained at a temperature below the drop point of said pressure medium, upon insertion of the pressure medium into said container.

5. A method as defined in claim 1, wherein, before inserted into said container, the pressure medium, billet and die are arranged in series in the above order from said container, and are then inserted simultaneously into said container along the center line of said container.

* * * * *